H. F. EGGERS.
GRAVE FILLER.
APPLICATION FILED MAY 14, 1912.
1,071,013.
Patented Aug. 19, 1913.
3 SHEETS—SHEET 3.
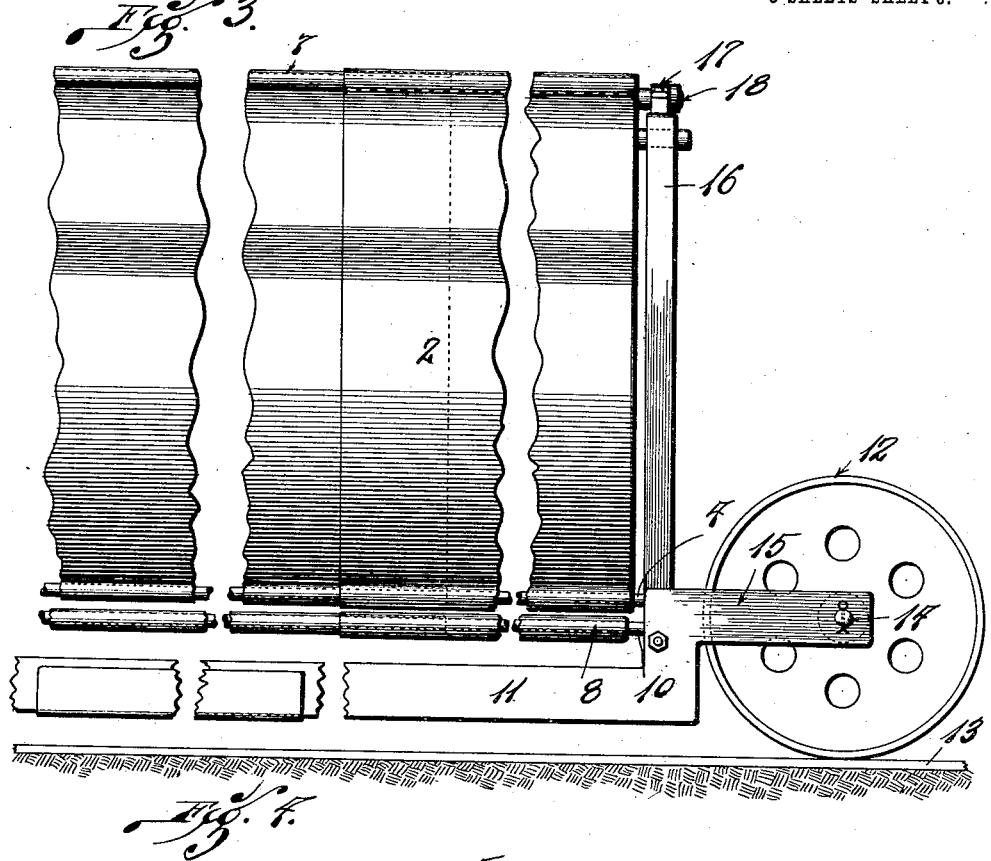
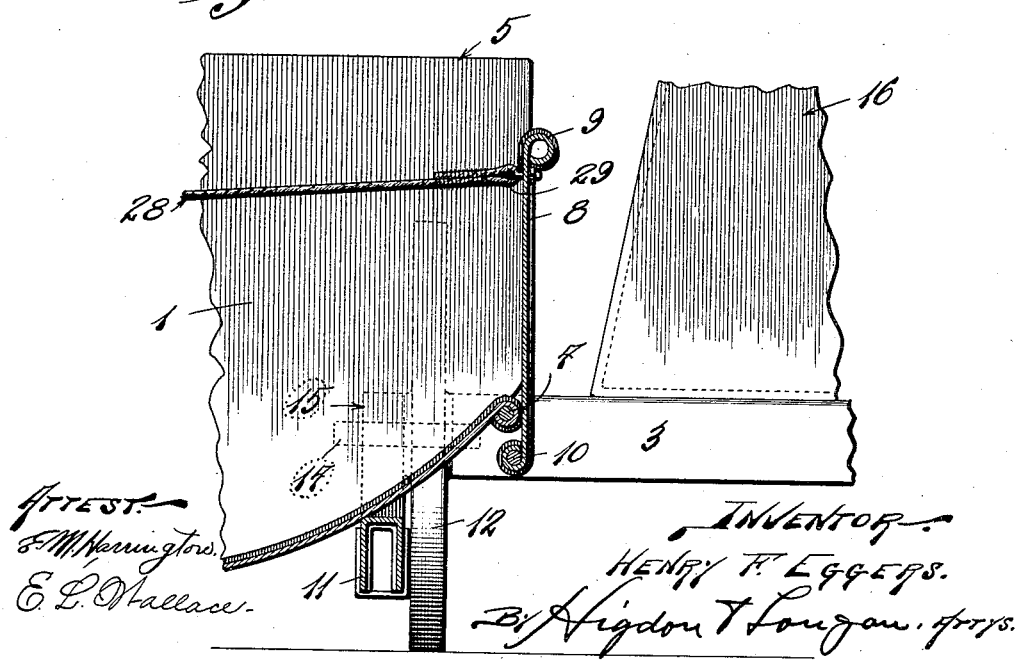
Attest:
S. M. Harrington
E. L. Wallace
Inventor
Henry F. Eggers
By Higdon & Longan, Attys.
COLUMBIA PLANOGRAPH CO., WASHINGTON, D. C.

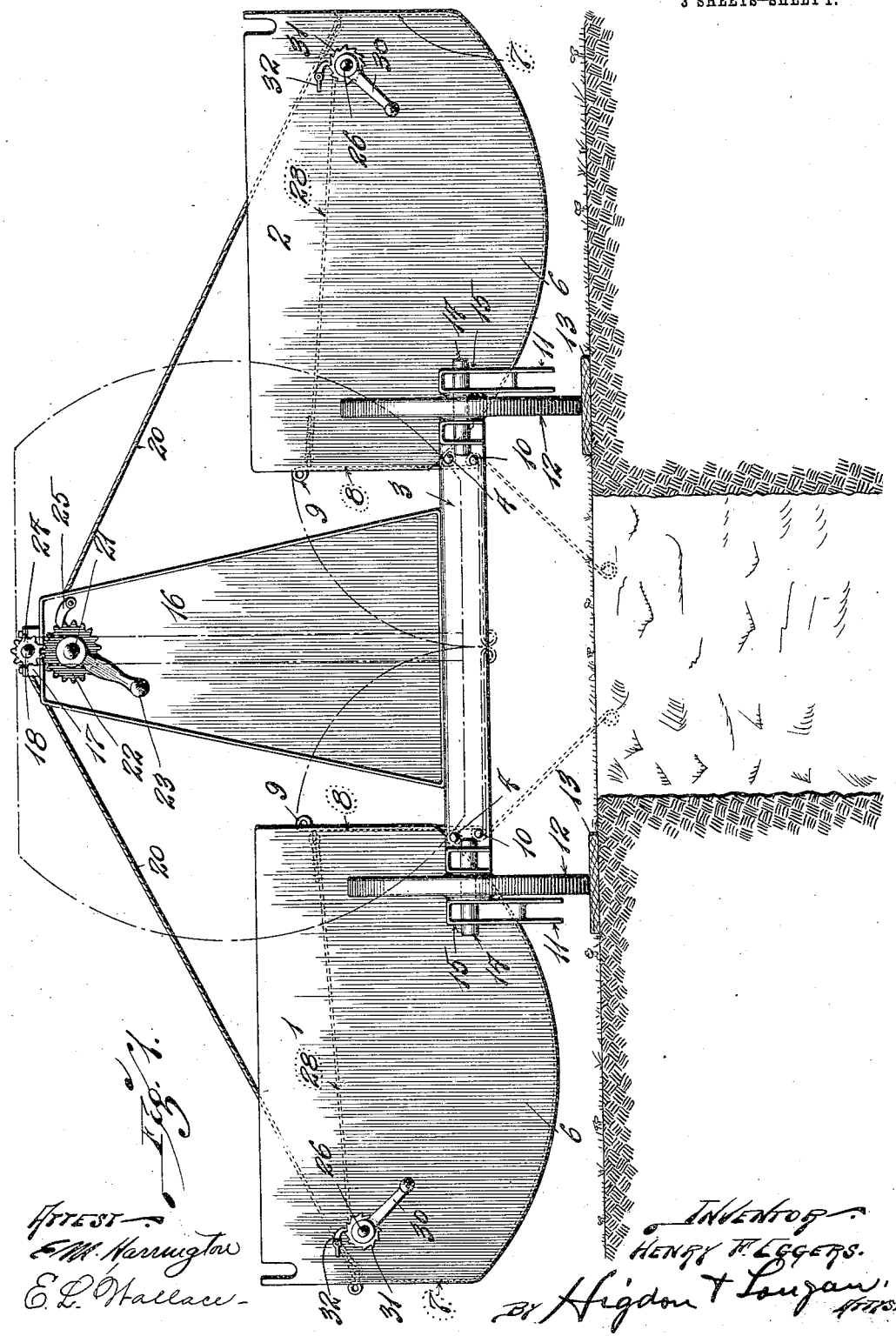

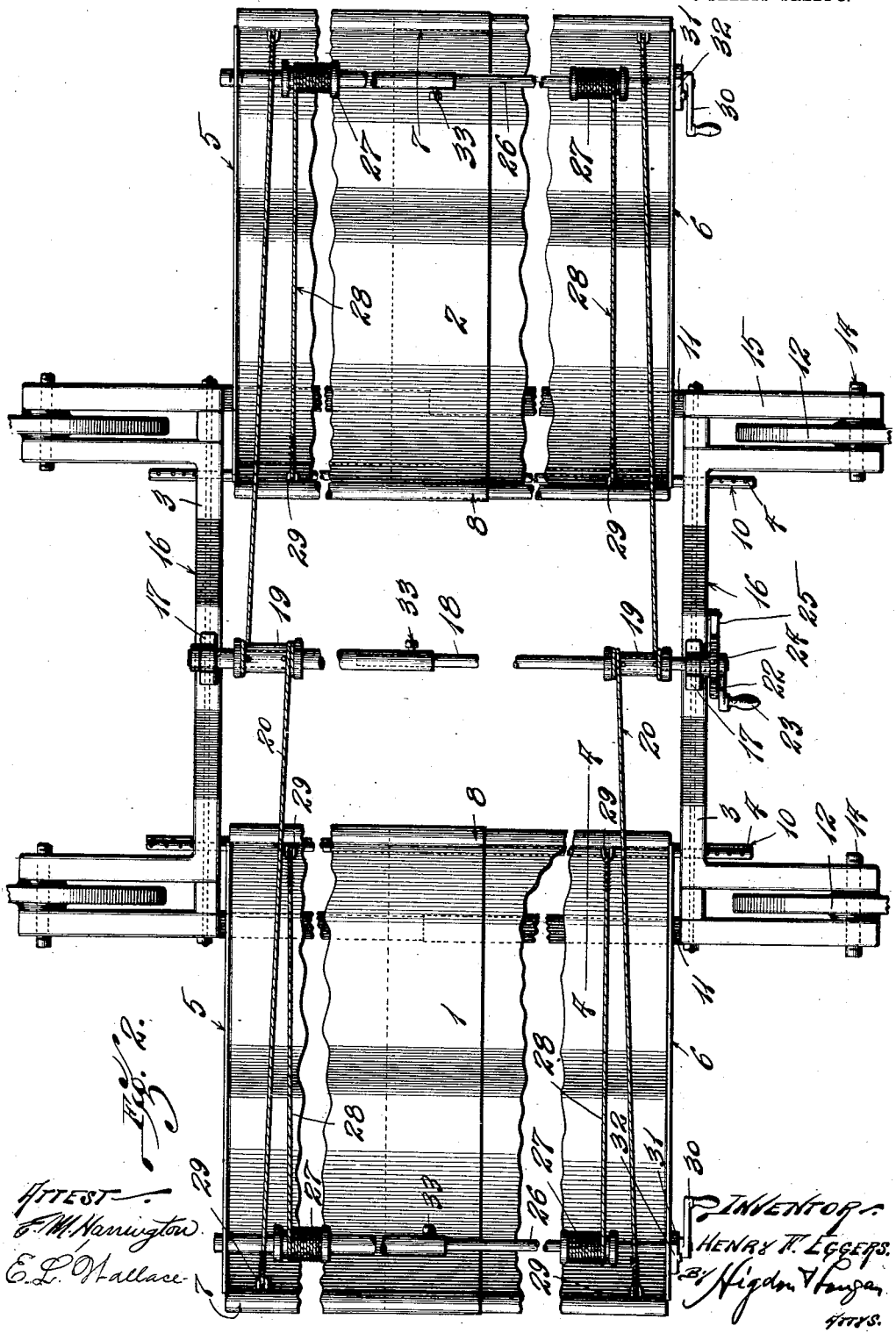

UNITED STATES PATENT OFFICE.

HENRY F. EGGERS, OF CHESTER, ILLINOIS.

GRAVE-FILLER.

1,071,013.  Specification of Letters Patent.  Patented Aug. 19, 1913.

Application filed May 14, 1912. Serial No. 697,344.

*To all whom it may concern:*

Be it known that I, HENRY F. EGGERS, a citizen of the United States, and resident of Chester, Illinois, have invented certain new and useful Improvements in Grave-Fillers, of which the following is a specification containing a full, clear, and exact description, reference being had to the accompanying drawings, forming a part hereof.

My invention relates to an improved machine for filling graves and consists in the novel construction hereinafter described and pointed out in the claims found at the end of this specification. The object of my invention is to provide an improved portable machine for use in filling graves and other openings or depressions in the ground, and which machine is preferably mounted upon a wheeled frame capable of being moved about on the ground or upon a suitable track.

A further object of my invention is to provide an improved machine especially for use in filling graves of different lengths, the hopper and frame of the machine being composed of sections which are telescopically adjustable endwise with relation to each other in order to make the length of the hopper correspond to the length of the grave to be filled.

Referring to the drawings; Figure 1 is an end elevation of my machine supported on suitable rails or tracks above an opening in the ground, with the hinged separable hopper sections opened out in a position to be filled with the earth thrown up from the grave. Fig. 2 is a plan view of the same, with parts broken away to economize in drafting space. Fig. 3 is a side elevation of one end of the machine having the hopper sections closed, with parts broken away to economize drafting space. Fig. 4 is a sectional end elevation taken on the line 4—4 of Fig. 2.

The numerals 1 and 2 indicate a pair of separable hopper sections, one of which is hinged to one side of the frame 3 and the other of which is hinged to the opposite side of the frame by means of a hinge rod 4 around which the metal composing the closed side of said sections is curved, as shown. The hopper sections 1 and 2 are preferably composed of a side wall to which are fixed the opposite end walls 5 and 6 and an outer or upper wall 7 while the opposite or inner wall is movable in the form of a hinged dumping bottom 8. The said hopper sections 1 and 2 are preferably rectangular in plan view when open, as shown in Fig. 2. The hinged dumping bottoms have their upper edges curved to form a marginal bead 9 for the purpose of strengthening said edge, and said dumping bottoms are hinged at their lower edges to a hinge rod 10 which extends parallel with said hopper hinge rod 4 and is connected with the end bars of the frame 3. The horizontal bars of the frame are offset downwardly at a point intermediate of the end bars so that the offset portion 11 acts as a stop to limit the downward movement of the hopper sections, and to support the same in a horizontal position as shown in Fig. 1.

The frame 3 is preferably supported upon wheels 12 which are adapted to run upon any suitable track formed of boards or planks 13. Said supporting wheels 12 may be of any common or usual construction and are provided with the usual journals 14 by means of which latter the frame is connected to said wheels. At the ends of the frame are parallel pairs of arms 15 in which the said wheels are mounted. Rising vertically from the cross bars at each end of the frame 3 is a fixed standard 16. Mounted in bearings 17 upon the upper ends of said standards 16 is a windlass shaft 18 carrying two spools or drums 19 upon which are wound and unwound ropes or chains 20 for raising and lowering the hopper sections. Mounted on a stud 21 projecting from one of the said standards 16 in a plane below the plane of the said shaft 18 is a gear wheel 22 to which is fixed a hand crank 23 and said gear wheel meshes with a pinion 24 fixed upon the adjacent projecting end of the said shaft 18 so that by rotating the said hand crank said windlass spools 19 will be correspondingly rotated to wind or unwind the said ropes or chains 20. A pawl 25 is mounted on the same standard 16 to engage the teeth of said gear wheel 22, to prevent reverse movement of said gear wheel. The bars of which the frame 3 is composed are preferably made of metal and of inverted U-shape in cross section. Each of the hinged dumping bottoms 8 is held in a closed position by means of suitable holding devices, which in the present case are in the form of a windlass shaft 26 mounted in suitable bearings formed in the opposite end walls 5 and 6 of the said hopper sections, spools 27 fixed upon said shafts and ropes or chains 28 adapted to be wound upon said spools and connected to the said hinged dumping bottoms by means of common staples 29. Fixed upon the projecting end of each of said windlass shafts 26 is a common hand crank 30 and ratchet wheel 31. A pawl 32 is mounted upon the hopper end 6 to engage said ratchet wheel and prevent rotation of said windlass shafts in one direction when desired.

In order to adapt the length of the hopper sections to graves or openings of various lengths, I make the offset longitudinal bars 11 of the frame and all of the hinge bars 4 and 10, the hopper sections 1 and 2 and the windlass shafts 18 and 26 in telescopic sections, adjustable in relation to each other in a longitudinal direction. Suitable set screws 33 are provided for locking the different sections of the shafts after they have been adjusted.

The operation is as follows: The dirt from the grave opening is loaded into the hopper sections 1 and 2 while the latter are in an open position, shown in Fig. 1, which may be done before or after the machine has been located above the grave. The loaded hopper sections may be dumped by rotating the hand crank 23, thus winding the ropes or chains 20 upon the spools 19, and drawing the outer or free edges of the said sections upwardly or inwardly until their inner edges occupy a substantially vertical position, as indicated by dotted lines in Fig. 1, after which the hinged dumping bottoms 8 are opened by unwinding the ropes or chains 28 from the spools 27 by means of the hand cranks 30, thus permitting the dirt to gradually gravitate from the said sections into the grave.

I claim as my invention:—

1. In an apparatus for filling graves, a wheeled frame, the lengthwise members of which frame are adjustable as to length, a pair of mating hoppers extended lengthwise of the frame and pivotally supported so that the margins of their open tops will abut when swung to substantially vertical positions, each of said hoppers being constructed of two or more pieces so that the length of each hopper may be varied, means for moving the hoppers to either open or closed positions, the innermost walls of said hoppers being hinged, and releasable means for holding said hinged walls so that, when the hoppers are filled and drawn to closed positions, the said walls may be released to discharge the contents of the hoppers, substantially as shown and for the purposes stated.

2. In a grave filler, a wheeled frame, opposite vertical standards fixed upon said frame, a pair of mating hoppers extending lengthwise of the frame and pivotally connected at their inner lower edges to the said frame, so that the margins of their open tops will abut when swung to substantially vertical positions between said opposite standards, means for moving the hoppers to either open or closed positions, the innermost walls of said hoppers being hinged at their lower edges, and releasable means for holding said hinged walls so that when the hoppers are filled and drawn to closed positions between said fixed standards, the said walls may be released to discharge the contents of the hopper.

In testimony whereof, I have signed my name to this specification, in presence of two subscribing witnesses.

HENRY F. EGGERS.

Witnesses:
N. E. BEORE,
H. M. BOON.

Copies of this patent may be obtained for five cents each, by addressing the "Commissioner of Patents, Washington, D. C."